(12) United States Patent
Merchant et al.

(10) Patent No.: US 6,480,490 B1
(45) Date of Patent: Nov. 12, 2002

(54) INTERLEAVED ACCESS TO ADDRESS TABLE IN NETWORK SWITCHING SYSTEM

(75) Inventors: Shashank Merchant, Sunnyvale, CA (US); John M. Chiang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/305,662

(22) Filed: May 5, 1999

(51) Int. Cl.$^7$ ............................................... H04L 12/28
(52) U.S. Cl. ...................................................... 370/389
(58) Field of Search ................................. 370/389, 401, 370/402, 412, 413–418, 392; 709/250; 712/26, 27, 29, 34

(56) References Cited

U.S. PATENT DOCUMENTS 5,515,376 A    5/1996   Murthy et al.
5,796,944 A  * 8/1998   Hill et al. .................... 710/19
5,825,774 A  * 10/1998  Ready et al. ................ 370/401
6,112,258 A  * 8/2000   Miller et al. ................. 710/19

* cited by examiner

Primary Examiner—Ajit Patel

(57) ABSTRACT

A novel method of providing interleaved access to an address lookup table in a multiport communication system having a decision making engine for controlling data switching between receive and transmit ports. A source address (SA) lookup logic circuit and a destination address (DA) connected in a pipeline are enabled to alternately access the address table. An arbitration circuit provides the SA and DA logic circuits with automatic access to the address table in alternate time slots allocated to these logic circuits. Also, the arbitration circuit enables an aging circuit and a host processor to periodically access the address table in pre-selected time slots.

19 Claims, 7 Drawing Sheets

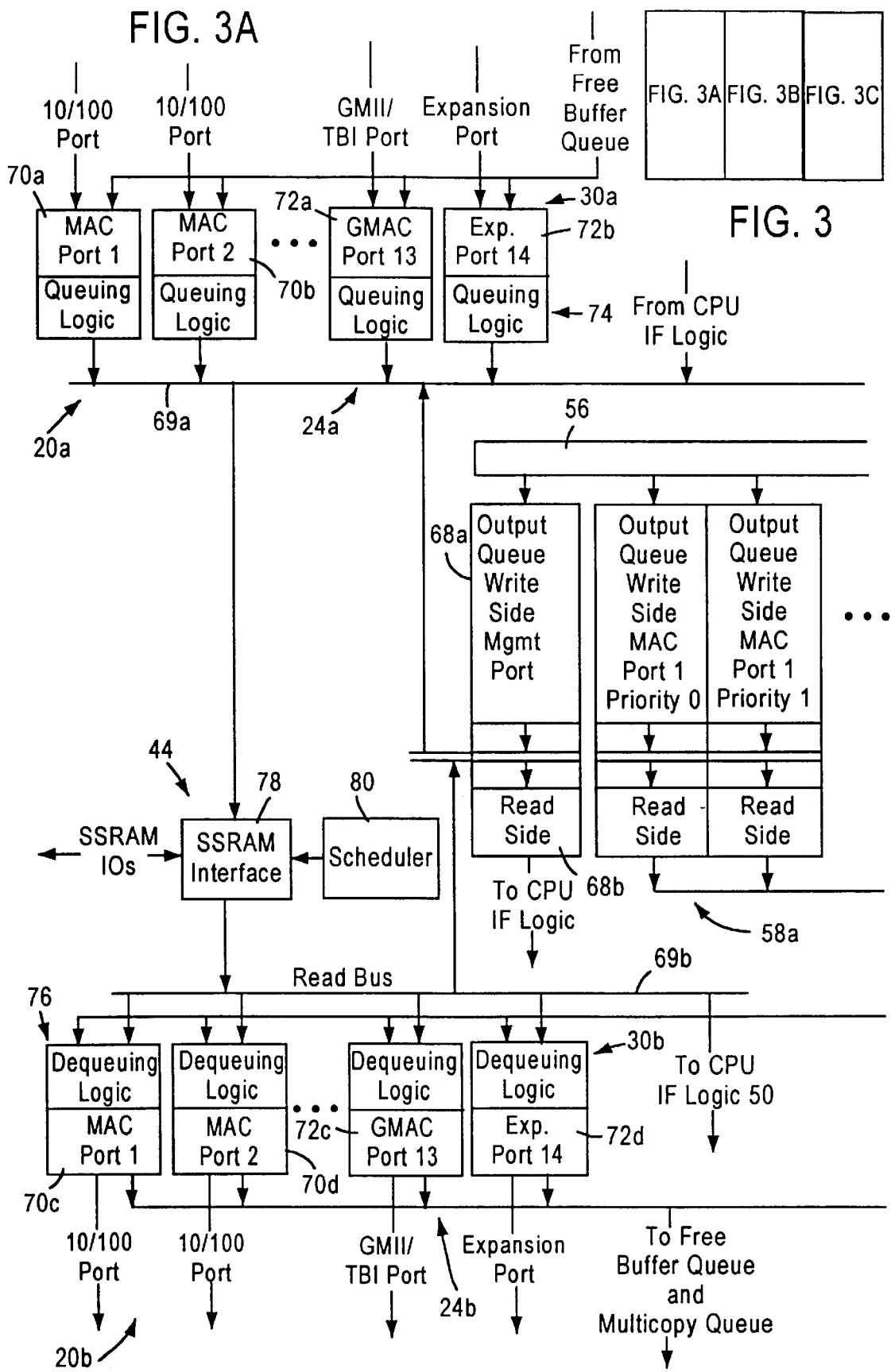

INTERLEAVED ACCESS TO ADDRESS TABLE IN NETWORK SWITCHING SYSTEM

FIELD OF THE INVENTION

This invention relates to data communication systems, and more particularly, to a system for providing interleaved access to a lookup address table in a multiport network switching system.

BACKGROUND ART

A multiport switch may be provided in a data communication network to enable data communication between multiple network nodes connected to various ports of the switch. A logical connection may be created between receive ports and transmit ports of the switch to forward received frames to appropriate destinations. Based on frame header information, a decision making engine selectively controls forwarding received frames to a destination station. The decision making engine comprises various units performing decision making operations. Some of the engine units need to access a lookup table that stores such data as source and destination address information and ports identification (ID) data. A multiple-port memory can be used to enable the engine units to access the address table via separate ports. However, such a memory occupies a substantial area on the chip and requires extremely high memory access rate to maintain high-speed operations.

To speed up the decision making process without using a multiple-port address table memory, it would be desirable to provide various units of the decision making engine with interleaved access to the lookup table.

DISCLOSURE OF THE INVENTION

The invention offers a novel method of providing interleaved access to an address lookup table in a multiport communication system having a decision making engine that controls data switching between receive and transmit ports. Data blocks representing received data packets are processed by first and second logic circuits of the decision making engine in accordance with a prescribed algorithm. The first and second logic circuits are enabled to alternately access the address table.

For example, the first logic circuit may access the address table for searching source address information, and the second logic circuit may access the address table for searching destination address information. The first and second logic circuits may be connected in a pipeline.

In accordance with one aspect of the invention, the decision making engine includes an address table storage for storing an address table having address information relating to the plurality of ports, and an interleaved address table access circuit for enabling the first and second logic circuits to alternately access the address table storage. The address table storage has a single port for providing both the first and second logic circuits with access to the address table.

Preferably, the interleaved address table access circuit comprises an arbitration circuit that provides the first and second logic circuits with access to the address table in alternate time slots allocated to these logic circuits. The arbitration circuit may enable the first and second logic circuits to automatically access the address table without requests for access from these logic circuits.

Also, the arbitration circuit may enable a third logic circuit of the decision making engine to access the address table in a pre-selected time slot allocated to the third logic circuit. For example, the third logic circuit may be an aging circuit that checks a pre-selected bit combination in the address table to delete an entry from the address table if the bit combination is in a predetermined state.

The third logic circuit may supply the arbitration circuit with a request signal to request access to the address table. If no request signal from the third logic circuit is received, the arbitration circuit may enable the first or the second logic circuit to access the address table in the time slot allocated to the third logic circuit.

Further, the arbitration circuit may provide a host processor with access to the address table in a pre-selected time slot allocated to the host processor.

The host processor access may be enabled in response to a request signal from the host processor. However, if no request signal from the host processor is received, the arbitration circuit enables the first or the second logic circuit to access the address table in the time slot allocated to the host processor.

Various objects and features of the present invention will become more readily apparent to those skilled in the art from the following description of a specific embodiment thereof, especially when taken in conjunction with the accompanying drawings.

BEST MODE FOR CARRYING OUT THE INVENTION

Figure 1:
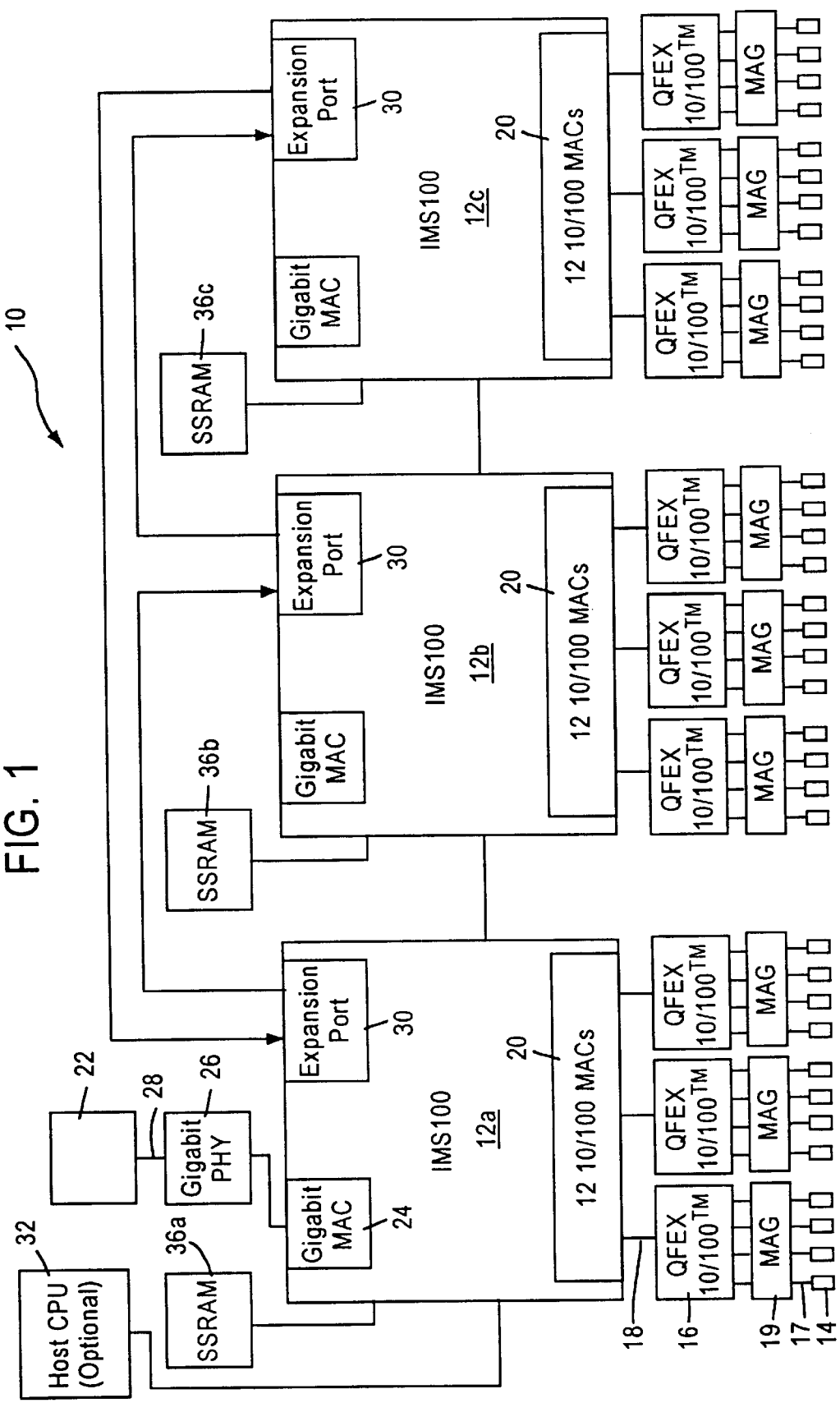
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the switches 12 selectively forward data packets received from the network nodes 14 or 22 to the appropriate destination based upon Ethernet protocol.

Each switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each switch 12 also includes a gigabit MAC port 24 for sending and receiving data packets to and from a gigabit PHY 26 for transmission to the gigabit node 22 via a high speed network medium 28.

Each 10/100 Mb/s network station 14 sends and receives data packets to and from the corresponding switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding switch 12.

Each switch 12 is coupled to 10/100 physical layer (PHY) transceivers 16 configured for sending and receiving data packets to and from the corresponding switch 12 across a corresponding media independent interface (MII) 18. A magnetic transformer 19 provides AC coupling between the PHY transceiver 16 and the corresponding network medium 17. Each switch 12 also includes an expansion port 30 for transferring data between other switches according to a prescribed protocol.

Figure 2:
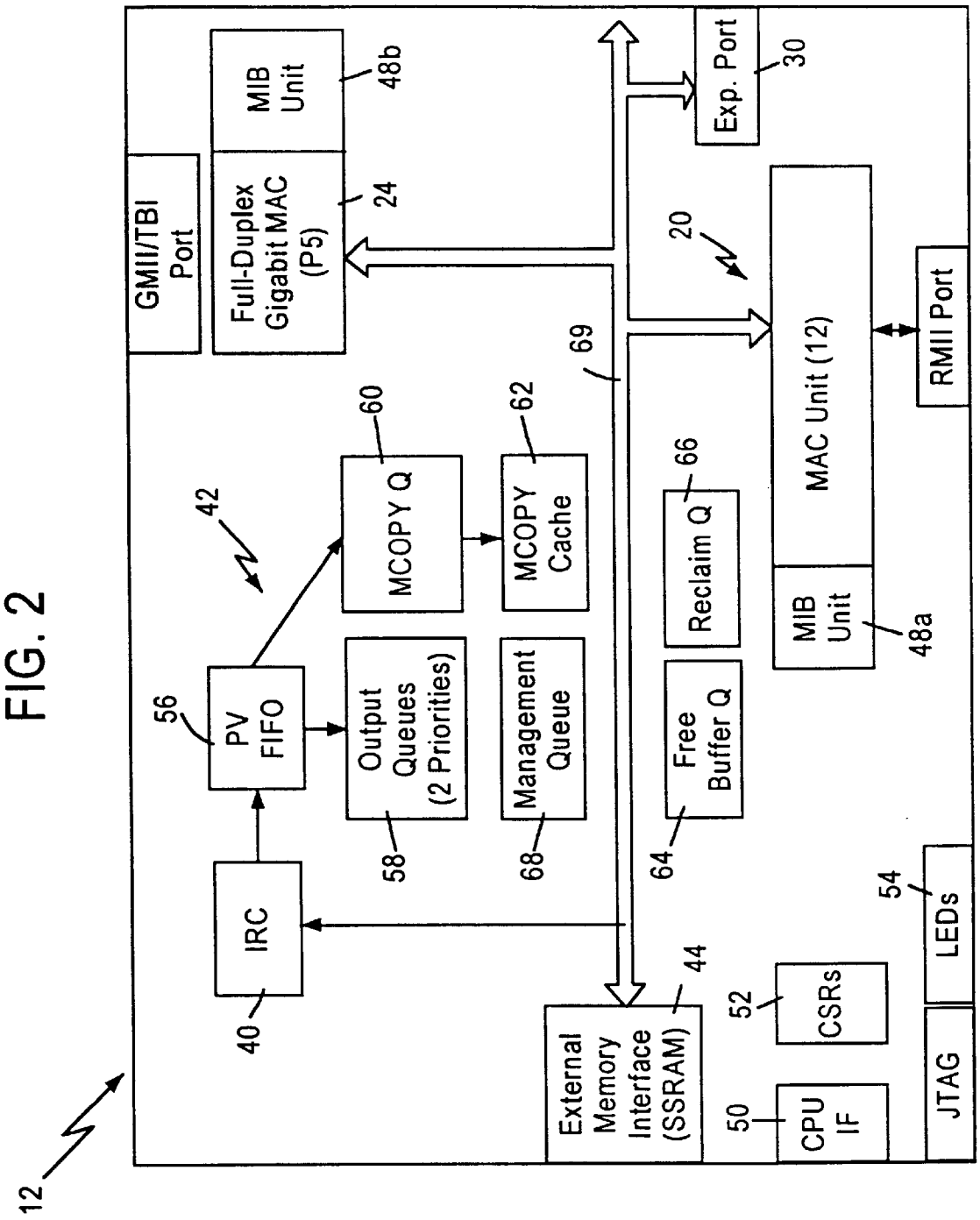
FIG. 2 is a block diagram of the multiple port switch of FIG. 1.

FIG. 2 is a block diagram of the switch 12. The switch 12 contains a decision making engine 40 that performs frame forwarding decisions, a switching subsystem 42 for transferring frame data according to the frame forwarding decisions, a buffer memory interface 44, management information base (MIB) counters 48, and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in a synchronous static random access memory (SSRAM) 36 in order to minimize the chip size of the switch 12. In particular, the switch 12 uses the SSRAM 36 for storage of received frame data, and memory structures. The memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128 K in 64-bit words. The size of the external memory 36 is preferably at least 1 Mbytes, with data transfers possible on every clock cycle through pipelining. Additionally, the external memory interface clock operates at clock frequencies of at least 66 MHz, and, preferably, 100 MHz and above.

The switch 12 also includes a processing interface 50 that enables an external management entity such as a host CPU 32 to control overall operations of the switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data frames received from one source to at least one destination station.

The switch 12 also includes an LED interface 54 that clocks out the status of conditions per port and drives external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet, including source, destination, and virtual LAN (VLAN) address information. The IRC 40 uses the header information to determine which MAC ports will output the data frame stored at the location specified by the frame pointer. The decision making engine may thus determine that a given data frame should be output by either a single port, multiple ports, or all ports (i.e., broadcast). Also, the IRC 40 may decide that the frame should not be forwarded to any port.

For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header. The IRC 40 may also determine that the received data frame should be transferred to another switch 12 via the expansion port 30. Hence, the internal rules checker 40 will decide whether a frame temporarily stored in the buffer memory 36 should be output to a single MAC port or multiple MAC ports.

The internal rules checker 40 outputs a forwarding decision to the switch subsystem 42 in the form of a forwarding descriptor. The forwarding descriptor includes a port vector identifying each MAC port that should receive the data packet, priority class identifying whether the frame is high priority or low priority, VLAN information, Rx port number, Opcode, and frame pointer. The port vector identifies the MAC ports to receive the data packet for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data packet transmission. In other words, the port vector FIFO 56 supplies the frame pointer on a per-port basis. The output queues 58 fetch the data packet identified in the port vector from the external memory 36 via the external memory interface 44, and supply the retrieved data packet to the appropriate transmit FIFO of the identified ports. If a data packet is to be supplied to a management agent, the frame pointer is also supplied to a management queue 68, which can be processed by the host CPU 32 via the CPU interface 50.

The multicopy queue 60 and the multicopy cache 62 keep track of the number of copies of the data packet that are fetched from the respective output queues 58, ensuring that the data packet is not overwritten in the SSRAM 36 until the appropriate number of copies of the data packet have been output from the SSRAM 36. Once the number of copies output corresponds to the number of ports specified in the port vector FIFO 56, the frame pointer is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
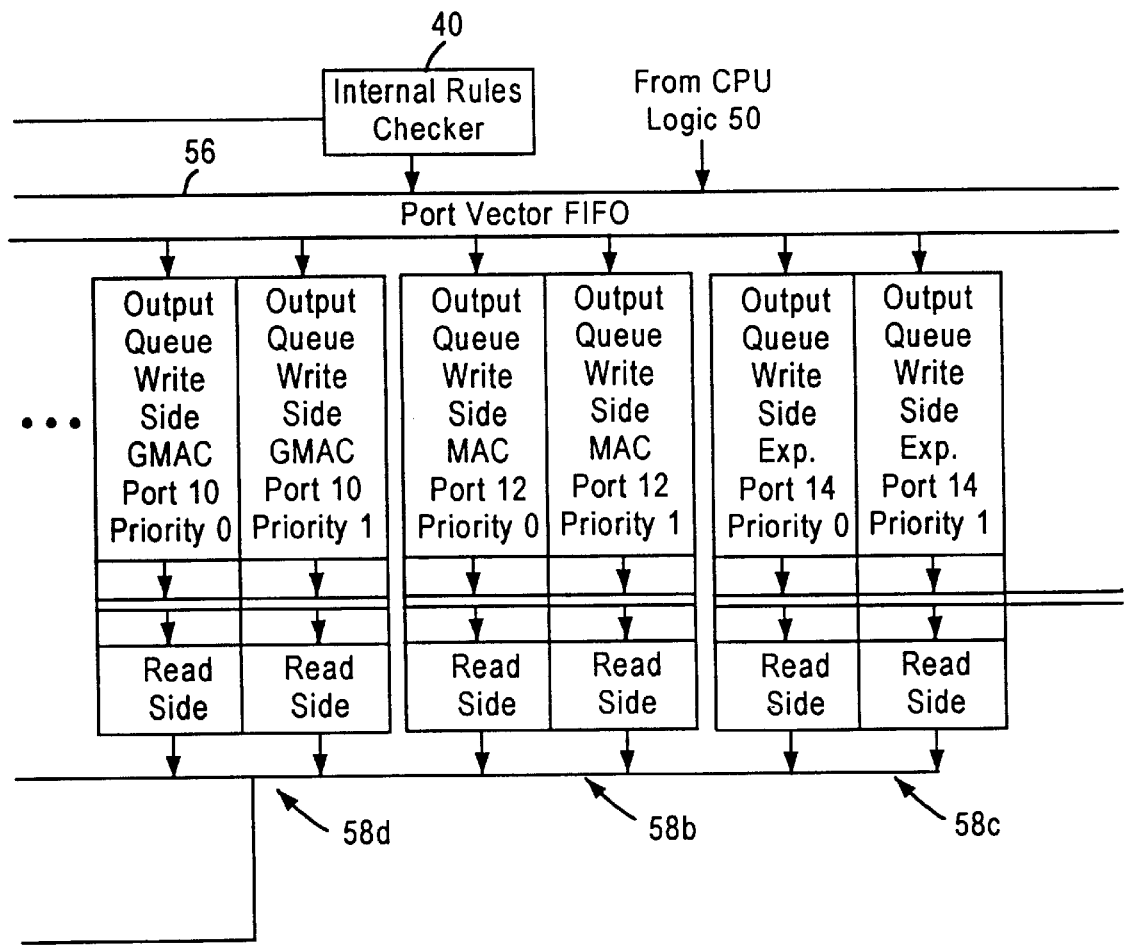
FIG. 3 is a block diagram illustrating in detail the switching subsystem of FIG. 2.
Figure 3C:
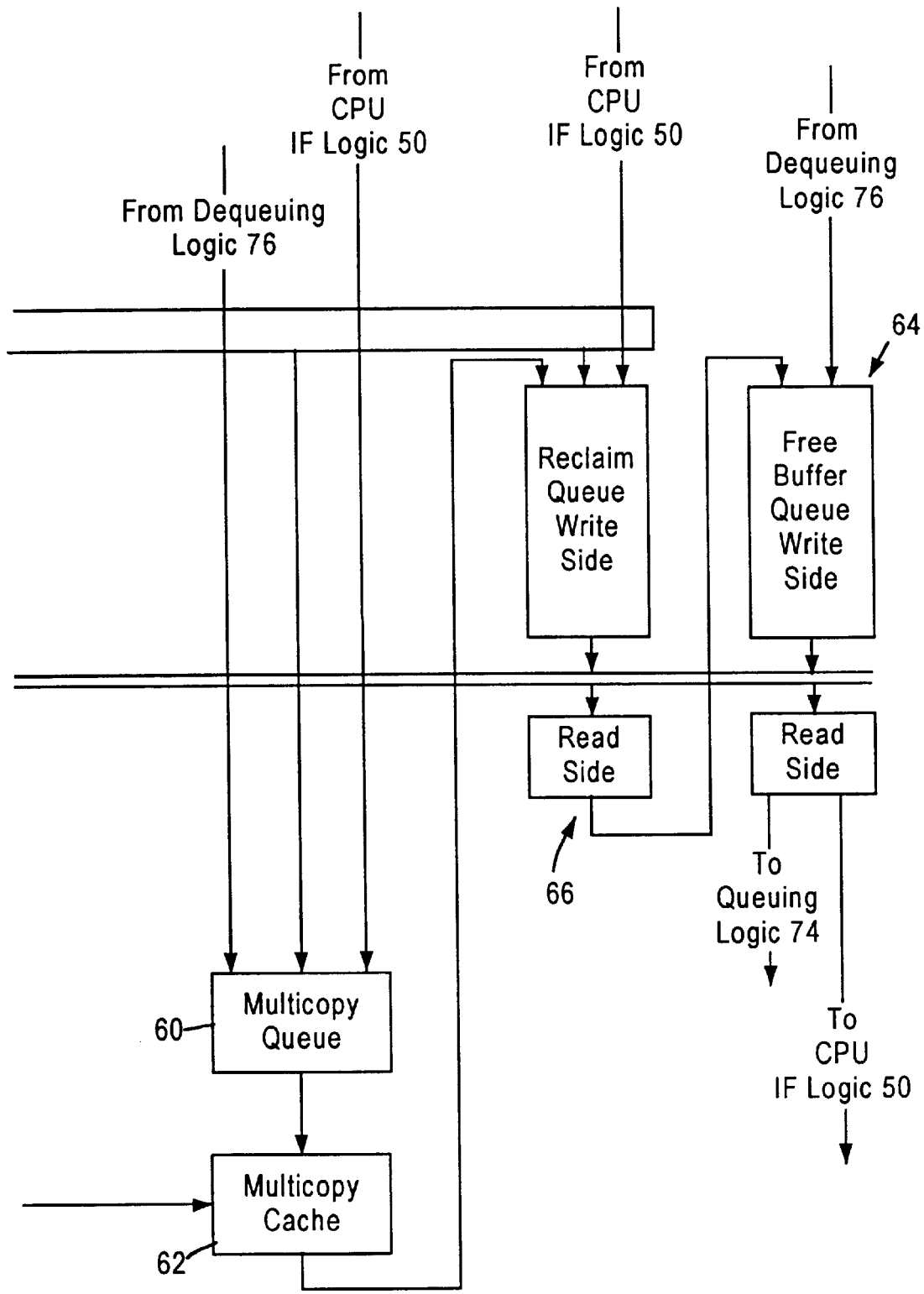

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20*a* and a transmit portion 24*b*. The receive portion 20*a* and the transmit portion 24*b* each include 12 MAC modules (only two of each shown and referenced by numerals 70*a*, 70*b*, 70*c*, and 70*d*) configured for performing the corresponding receive or transmit function according to IEEE 802.3 protocol. The MAC modules 70*c* and 70*d* perform the transmit MAC operations for the 10/100 Mb/s switch ports complementary to modules 70*a* and 70*b*, respectively.

The gigabit MAC port 24 also includes a receive portion 24*a* and a transmit portion 24*b*, while the expansion port 30 similarly includes a receive portion 30*a* and a transmit portion 30*b*. The gigabit MAC port 24 and the expansion port 30 also have receive MAC modules 72*a* and 72*b* optimized for the respective ports. The transmit portions 24*b* and 30*b* of the gigabit MAC port 24 and the expansion port 30*a* also have transmit MAC modules 72*c* and 72*d*, respectively. The MAC modules are configured for full-duplex operation on the corresponding port, and the gigabit MAC modules 72*a* and 72*c* are configured in accordance with the Gigabit Proposed Standard IEEE Draft P802.3z.

Each of the receive MAC modules 70*a*, 70*b*, 72*a*, and 72*b* include queuing logic 74 for transfer of received data from the corresponding internal receive FIFO to the external memory 36 and the rules checker 40. Each of the transmit MAC modules 70*c*, 70*d*, 72*c*, and 72*d* includes a dequeuing logic 76 for transferring data from the external memory 36 to the corresponding internal transmit FIFO. The queuing logic 74 uses the fetched frame pointers to store receive data to the external memory 36 via the external memory interface controller 44. The frame buffer pointer-specifies the location in the external memory 36 where the received data frame will be stored by the receive FIFO.

The external memory interface 44 includes a scheduler 80 for controlling memory access by the queuing logic 74 or dequeuing logic 76 by any switch port to the external memory 36, and an SSRAM interface 78 for performing the read and write operations with the SSRAM 36. In particular, the switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69*a* from the receive FIFO to the external memory 36 in a direct memory access (DMA) transaction during the assigned slot based on the retrieved frame pointer. The frame is stored in the location pointed to by the free buffer pointer obtained from the free buffer pool 64, although a number of other buffers may be used to store a frame, as will be described.

The rules checker 40 also receives the frame pointer and the header information (including source address, destination address, VLAN tag information, etc.) by monitoring (i.e., snooping) the DMA write transfer on the write data bus 69*a*. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the queues 58 or the management queue 68, should receive the associated frame pointer. The port vector FIFO 56 places the frame pointer into the top of the appropriate queue 58 and/or 68. This queues the transmission of the frame. The output queue 68 is processed separately by the host CPU 32 via the CPU interface 50.

As shown in FIG. 3, each of the transmit MAC units 70*d*, 70*e*, 70*f*, 72*d*, and 72*c* have an associated output queue 58*a*, 58*b*, 58*c*, 58*d*, and 58*e*, respectively. Preferably, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example the output queue 58*e* for the gigabit transmit MAC 72*c*. The dequeuing logic 76 for the transmit gigabit port 24*b* takes the frame pointer from the corresponding gigabit port output queue 58*e*, and issues a request to the scheduler 80 to read the frame data from the external memory 36 at the memory location specified by the frame pointer. The scheduler 80 schedules the request, and issues a grant for the dequeuing logic 76 of the transmit gigabit port 24*b* to initiate a DMA read. In response to the grant, the dequeuing logic 76 reads the frame data (along the read bus 69*b*) in a DMA transaction from the location in external memory 36 pointed to by the frame pointer, and stores the frame data in the internal transmit FIFO for transmission by the transmit gigabit MAC 72*c*. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and reuse of frame pointers once the frame has been transmitted to its designated output port(s). In particular, the dequeuing logic passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO also copies the frame pointer and the copy count to the multicopy queue 60. The multicopy queue writes the copy count to the multicopy cache 62. The multicopy cache is a random access memory having a single copy count for each buffer in external memory (i.e., each frame pointer).

Once the dequeuing logic 76 retrieves the frame data for a particular output port based on a fetched frame pointer and stores the frame data in the transmit FIFO, the dequeuing logic checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list chain of frame pointers to identify the entire stored data frame. The reclaim queue 66 traverses the chain of buffer locations identified by the frame pointers, and passes the frame pointers to the free buffer queue 64.

As discussed above, the internal rules checker (IRC) 40 monitors the write bus to capture frame header information (including source, destination, and VLAN address information) and frame pointers associated with received frames. The IRC 40 uses the frame pointer value and the frame header information to determine which MAC ports will output the data frame stored at the location specified by the frame pointer.

Figure 4:
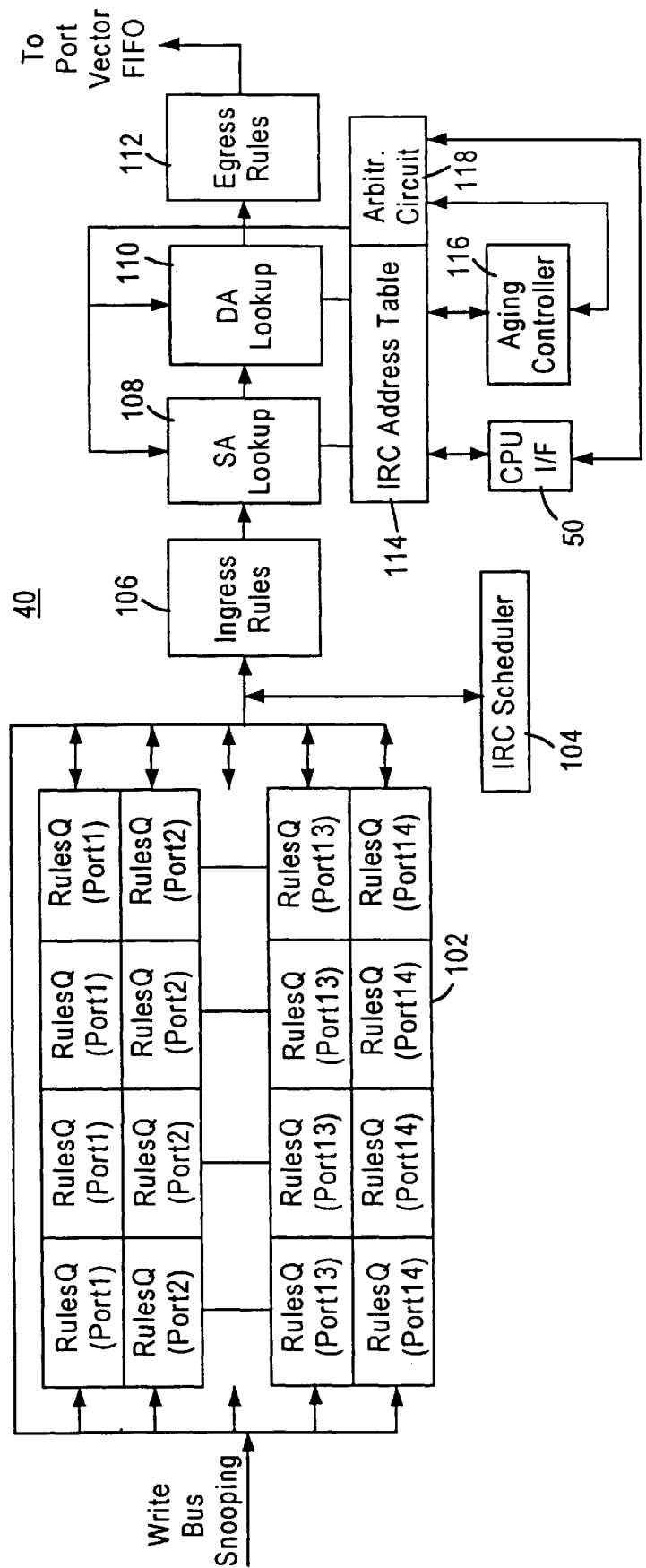
FIG. 4 is a block diagram of an internal rules checker (IRC) of the present invention.

As shown in FIG. 4, the IRC 40 may contain multiple rules queues 102 arranged for holding frame pointers and frame header information. A single rules queue 102 is assigned to each receive port of the IMS 12 for storing information associated with the frames received via the corresponding port. In particular, rules queues 1 to 12 may be provided for 10/100 MAC ports 1 to 12 configured to receive data from the corresponding 10/100 Mb/s network stations 14, a rules queue 13 may be arranged to support the gigabit MAC port 24 capable of receiving data from the gigabit network node 22, and a rules queue 14 may be assigned to the expansion port 30. In each rules queue 102, frame headers may be stored in a static random access memory (SRAM) having four 40-byte entries, and frame pointers may be stored in a SRAM having four 13-bit entries.

Frame headers and frame pointers from the rules queues 102 are transferred to IRC logic circuitry including an ingress rules logic circuit 106, a source address (SA) lookup logic circuit 108, a destination address (DA) lookup logic circuit 110 and a forward descriptor (FD) generator 112. The IRC scheduler 104 provides time slots for sequential transferring data held in the rules queues 102 to the IRC logic circuitry. The SA lookup logic circuit 108 and the DA lookup logic circuit 110 are connected to IRC address table logic 114 that contains an SRAM for storing IRC address table having address entries described below.

The IRC logic circuits 106, 108, 110 and 112 are connected in a pipeline that processes the frame header information of every received frame to produce a forwarding descriptor supplied to the port vector FIFO 56. In particular, the ingress rules logic 106 detects whether a frame was received with an error and checks for preset DA and VLAN information. If an error is detected or the frame address information does not match with allocated DA addresses or VLAN data, the ingress rules logic 106 produces a forwarding descriptor with a null port vector. This forwarding descriptor is transferred directly to the port vector FIFO 56 without performing SA and DA lookup operations and egress rules operations.

The SA lookup logic circuit 108 search the IRC address table 114 for entries associated with the MAC source addresses for the corresponding frame. For instance, the SA lookup logic circuit 108 checks whether the SA and VLAN information stored in the IRC address table 114 for a given receive port matches the SA and VLAN information obtained from the received frame. If unknown source address is obtained from a frame received by a particular switch port, the SA lookup logic circuit may learn such address and add a new address entry to the IRC address table 114.

The DA lookup logic circuit 110 searches the DA and VLAN information in the IRC address table 114 to make a frame forwarding decision. In particular, the DA lookup logic circuit 110 checks whether the DA and VLAN information stored in the IRC address table 114 for a given transmit port matches the DA and VLAN information obtained from the received frame.

If the source and destination information of a frame match with the corresponding information in the address table, the FD generator 112 performs egress rules operations to check each transmit port in the port vector list produced by the DA lookup logic circuit 110 to remove or mask disabled ports, ports that do not belong to a required VLAN, and the port, from which the frame is received. As a result, the FD generator 112 generates a forwarding descriptor including a port vector identifying each MAC port that should receive the corresponding frame.

Figure 5:
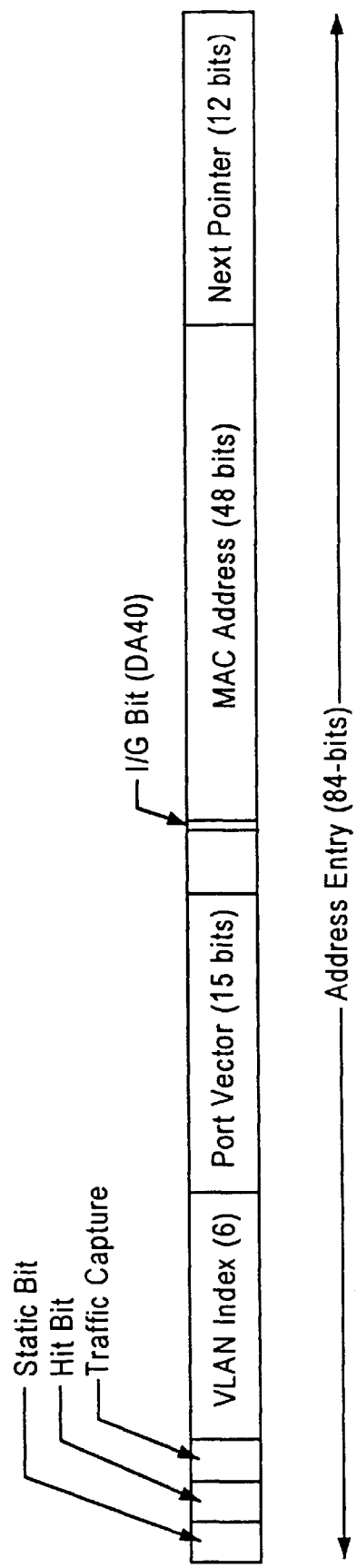
FIG. 5 is a diagram illustrating the format of an address entry in the IRC address table.

The IRC address table 114 contained in a single-port SRAM may be arranged as an array with multiple address entries. For example, the IRC address table may contain 4096 address entries. As illustrated in FIG. 5, each IRC address entry may contain 84 bits including a static bit, a hit bit, a traffic capture bit, a 6-bit VLAN index, a 15-bit port vector, a 48-bit MAC address, and a 12-bit next pointer.

The switch 12 may be provided with an aging algorithm performed by an aging circuit 116, which can automatically delete old entries. The static bit is provided to prevent the aging algorithm from deleting an entry, in which the static bit is set. The set status of the static bit in an address entry indicates that the address entry was programmed under host CPU control and cannot be deleted from the IRC address table 114 by the aging circuit 116. The host CPU 32 can access the IRC address table 114 via the CPU interface 50.

The hit bit is also used to support the aging algorithm. Whenever the IRC finds source address and VLAN index match or creates a new entry in the IRC address table 114, it sets the hit bit. The aging circuit 116 periodically polls the hit bits of all address entries, and if both the hit bit and the static bit are cleat, the entry will be deleted from the table. If the hit bit is set and the static bit is clear, the aging circuit 116 clears the hit bit.

The VLAN index field contains an index for accessing VLAN identification information. A VLAN index to VLAN ID table may be used to provide mapping to 12-bit VLAN ID information. The host CPU 32 via the CPU interface 50 may update the VLAN index field.

The traffic capture bit identifies capture of MAC address data for reporting MAC communications to the management queue. The port vector field provides the forwarding descriptor with a vector describing the ports that the frame should be forwarded to. The MAC address field provides source and destination address and VLAN information, and the receive port number. This information is used for matching with the corresponding information of a received frame. The next pointer field identifies the location of the next address entry.

Thus, the SA lookup logic circuit 108, and the DA lookup logic circuit 110 require access to the IRC address table 114 during pipelined operations performed by the IRC logic circuitry. Also, the aging circuit 116 and the host CPU 32 needs to access the IRC address table 114 to check and update entries.

In accordance with the present invention, an interleaved IRC address table access system enables the SA lookup logic circuit 108 and the DA lookup logic circuit 110 to alternately access the IRC address table 114. Also, the interleaved IRC address table access system of the present invention enables the aging circuit 116 and the host CPU 32 to periodically access the IRC address table 114.

The interleaved IRC address table access system comprises an arbitration circuit 118 provided in the IRC 40 for enabling the SA lookup logic circuit 108, the DA lookup logic circuit 110, the aging circuit 116 and the host CPU 32 to access the IRC address table 114 via a single port of the address table SRAM. The arbitration circuit 118 allocates fixed time slots for accesses to the IRC address table 114 by the SA lookup logic circuit 108, the DA lookup logic circuit 110, the aging circuit 116 and the host CPU 32.

For example, in each address table access cycle, 8 time slots may be allocated to the SA lookup logic circuit 108, 8 time slots may be allocated to the DA lookup logic circuit 110, 1 time slot may be reserved for the aging circuit 116 and 1 time slot may be reserved for the host CPU 32. A single time slot for the address table access may correspond to one clock cycle.

The arbitration circuit 118 may have a clock counter that counts the clock cycles to perform address table access scheduling. The SA lookup logic circuit 108 and the DA lookup logic circuit 110 are assigned with alternate time slots. For example, the first time slot may be allocated to the SA lookup logic circuit 108; the second time slot, to the DA lookup logic circuit 110; the third time slot, to the SA lookup logic circuit 108; the fourth time slot, to the DA lookup logic circuit 110, etc. Finally, the seventeenth time slot in the address table access cycle may be allocated to the aging circuit 116, and the eighteenth time slot may be allocated to the host CPU 32.

The arbitration circuit 118 alternately supplies the SA lookup logic circuit 108 and the DA lookup logic circuit 110 with enabling signals to enable the circuits 108 and 110 to access the IRC address table 114 in alternate time slots. Further, the arbitration circuit 118 receives access request signals from the aging circuit 116 and the host CPU 32. In response to the access request signal from the aging circuit 116, the arbitration circuit 118 supplies the aging circuit 116 with an enabling signal that enables the aging circuit 116 to access the IRC address table 114 during the time slot allocated to the aging circuit 116. Similarly, in response to the access request signal from the host CPU 32, the arbitration circuit 118 supplies the host CPU 32 via the CPU interface 50 with an enabling signal that enables the host CPU 32 to access the IRC address table 114 during the time slot allocated to the host CPU 32.

If no access request is received from the aging circuit 116 or the host CPU 32, the arbitration circuit 118 grants the time slot reserved for the aging circuit 116 or the host CPU 32 to either the SA lookup logic circuit 108 or the DA lookup logic circuit 110 depending on which of these circuits had the last access to the IRC address table 114. For example, if no access request from the aging circuit 116 is received and the time slot reserved for the aging circuit 116 follows the time slot, during which the DA lookup logic circuit 110 performed access to the IRC address table 114, the arbitration circuit 118 enables the SA lookup logic circuit 108 to access the IRC address table 114 during the time slot reserved for the aging circuit 116.

Thus, the interleaved address table access system of the present invention enables the SA lookup logic circuit 108 and the DA lookup logic circuit 110 to alternately access the address table 114 during pipelined IRC logic operations. As a result, the address table 114 may be stored in a single-port SRAM instead of a dual-port SRAM that would be required without the interleaved access. As recognized in the art, a single-port SRAM occupies much less area on the chip than a dual-port SRAM. Moreover, the use of a single-port SRAM for storing the IRC address table, instead of a dual-port SRAM, eliminates the need to increase the rate of address table memory access in order to maintain high-speed operations in the IMS 12.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A multiport data communication system for transferring data packets between ports, the data communication system comprising:

receive ports for receiving data packets from a plurality of network nodes, a decision making engine responsive to the received data packets for controlling transmission of the received data packets to at least one selected transmit port, the decision making engine including:

an address table storage for storing an address table having address information relating to the ports, first and second logic circuits interacting with the address table storage for processing data blocks representing the received data packets in accordance with a prescribed algorithm, and an interleaved address table access circuit for enabling said first and second logic circuits to alternately access the address table, wherein the interleaved address table access circuit comprises an arbitration circuit for providing the first and second logic circuits with access to the address table in alternate time slots allocated to the first and second logic circuits.

2. The system of claim 1, wherein the first and second logic circuits are connected in a pipeline.

3. The system of claim 1, wherein the first logic circuit is configured for searching source address information in the address table.

4. The system of claim 3, wherein the second logic circuit is configured for searching destination address information in the address table.

5. The system of claim 1, wherein the address table storage is configured to have a single port for providing both the first and second logic circuits with access to the address table.

6. A multiport data communication system for transferring data packets between ports, the data communication system comprising:

receive ports for receiving data packets from a plurality of network nodes; and a decision making engine responsive to the received data packets for controlling transmission of the received data packets to at least one selected transmit port, the decision making engine including:

an address table storage for storing an address table having address information relating to the ports;

first and second logic circuits interacting with the address table storage for processing data blocks representing the received data packets in accordance with a prescribed algorithm; and an interleaved address table access circuit for enabling said first and second logic circuits to alternately access the address table, wherein the address table storage is configured to have a single port for providing both the first and second logic circuits with access to the address table, and the interleaved address table access circuit comprises an arbitration circuit for providing the first and second logic circuits with access to the address table in alternate time slots allocated to the first and second logic circuits.

7. The system of claim 6, wherein the decision making engine further comprises a third logic circuit having access to the address table.

8. The system of claim 7, wherein the third logic circuit is configured for checking a pre-selected bit combination in the address table to delete an entry from the address table if the bit combination is in a predetermined state.

9. The system of claim 7, wherein the arbitration circuit is configured to provide the third logic circuit with periodic access to the address table in a first pre-selected time slot allocated to the third logic circuit.

10. The system of claim 9, wherein the third logic circuit is configured for supplying the arbitration circuit with a request signal to request access to the address table.

11. The system of claim 10, wherein the arbitration circuit is configured to enable one of the first and second logic circuits to access the address table in the first pre-selected time slot, if no request signal from the third logic circuit is received.

12. The system of claim 6, wherein the arbitration circuit is configured to provide the first and second logic circuits with automatic access to the address table without requests from the first and second logic circuits.

13. The system of claim 6, wherein the decision making engine interacts with a host processor.

14. The system of claim 13, wherein the arbitration circuit is configured to provide the host processor with periodic access to the address table in a second pre-selected time slot allocated to the host processor.

15. The system of claim 14, wherein the arbitration circuit is configured for receiving a request signal from the host processor requesting access to the address table.

16. The system of claim 15, wherein the arbitration circuit is configured to enable one of the first and second logic circuits to access the address table in the second pre-selected time slot, if no request signal from the host processor is receive.

17. In a communication system having a decision making engine for controlling data switching between receive and transmit ports using an address table for storing address information relating to the receive and transmit ports, a method of providing access to the address table, comprising the steps of:

processing data blocks representing received data packets by first and second logic circuits in accordance with a prescribed algorithm for controlling transmission of the received data packets to at least one selected transmit port, and enabling the first and second logic circuits to alternately access the address table, wherein the first and second logic circuits are assigned with alternate time slots for access to the address table.

18. The method of claim 17, wherein the first and second logic circuits perform pipelined operations.

19. The method of claim 18, wherein the first logic circuit accesses the address table for searching source address information, and the second logic circuit accesses the address table for searching destination address information.

* * * * *